Oct. 30, 1962 K. E. HUMBERT, JR 3,061,101
FILTER STRUCTURE CARRYING PRESSURE RELIEF
AND ANTI-DRAIN-BACK VALVES
Filed May 17, 1960 3 Sheets-Sheet 1

INVENTOR
Kingsley E. Humbert Jr

BY Shoemaker and Mattare
ATTORNEYS

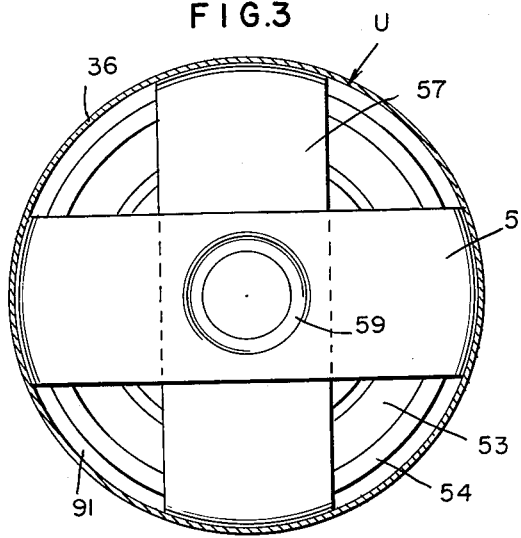
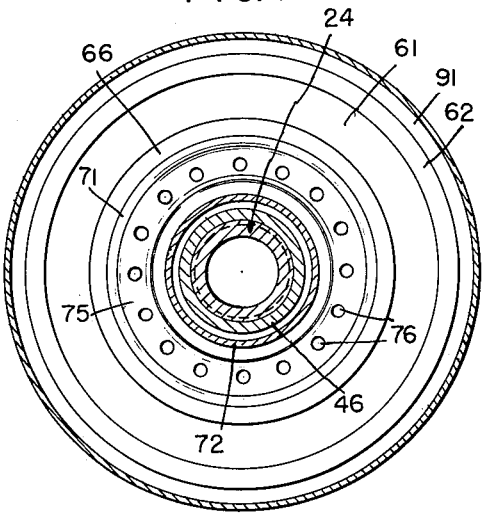
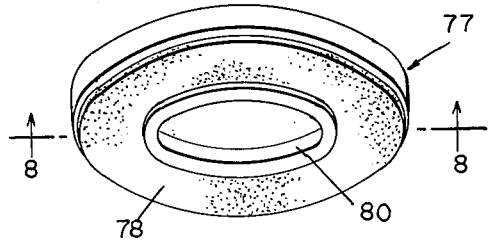
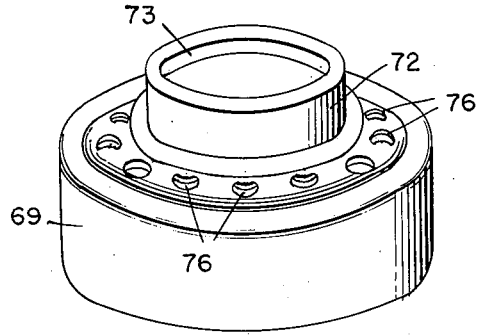
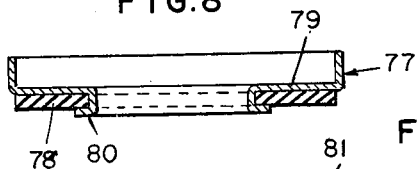
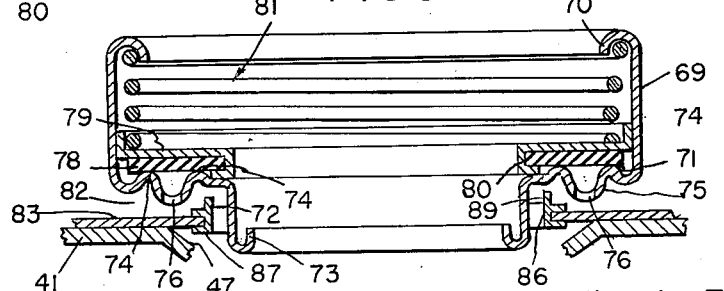
INVENTOR
Kingsley E. Humbert, Jr.
BY Shoemaker and Mattare
ATTORNEYS

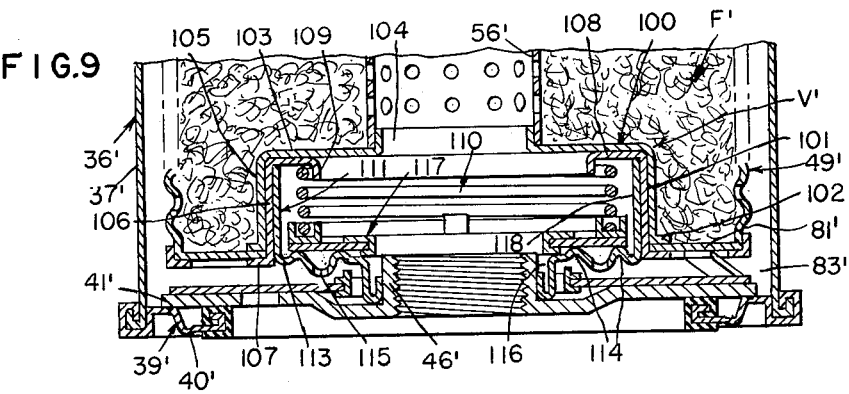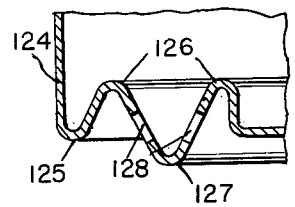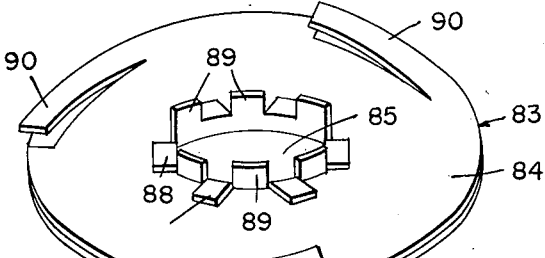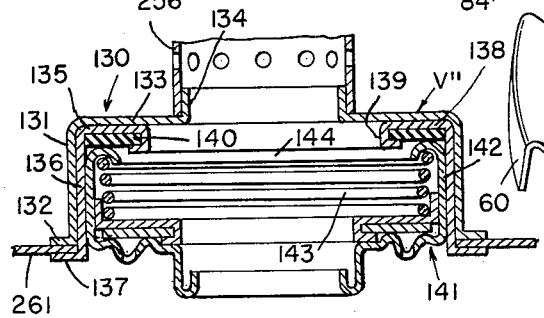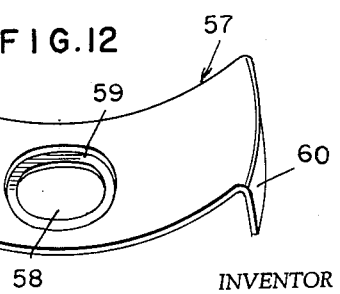

United States Patent Office 3,061,101
Patented Oct. 30, 1962

3,061,101
FILTER STRUCTURE CARRYING PRESSURE RELIEF AND ANTI-DRAIN-BACK VALVES
Kingsley E. Humbert, Jr., Gastonia, N.C., assignor to Wix Corporation, Gastonia, N.C., a corporation of North Carolina
Filed May 17, 1960, Ser. No. 29,704
8 Claims. (Cl. 210—130)

This invention relates generally to improvements in filters and is directed more particularly to an improved type of oil filter which is designed primarily for use in motor vehicle lubricating systems.

The present trend in motor vehicle filters is toward filters of the screw-on, throw away type which are easily and quickly replaceable after they become clogged or otherwise unfit for further use and the present filter structure is of this throw away type and further is of an improved full flow construction which will permit the continued supplying of lubricant to various engine parts or to the oil gallery even after the filter material or the filtering cartridge may have become so choked or obstructed as to refuse to pass oil through in the desired manner.

To permit the continued passage of oil after the filter cartridge may have become reduced in efficiency to the point where very little oil is passing therethrough, a pressure relief means is required to open a clear passageway for the return of oil to the oil system and, therefore, it is a particular object of the present invention to provide a full flow, screw-on, throw away type filter having a new and novel type of pressure relief valve means which is associated with and installed in the filter cartridge at the inlet end of the filter unit shell.

A further object of the invention is to provide in a filter structure of the character stated a new and novel type of pressure relief valve in which the valve elements are designed in such a manner that they may be easily and quickly assembled and press fitted together.

Still another object of the invention is to provide in a filter structure of the character stated a pressure relief or by-pass valve structure wherein the valve seating spring is placed under required compression or preloading simultaneously with the assembling and press fitting of the parts.

Still another object of the invention is to provide a filter structure having a by-pass or pressure relief valve installed in the inner end of the filter cartridge and which valve structure is designed so that the parts may be readily formed by stamping and also formed so as to fit together in a manner to provide a spring and valve element casing.

The invention will be best understood from a consideration of the following detailed description taken in connection with the accompanying drawings with the understanding that the invention is not confined to a strict conformity with the showing of the drawings but may be changed or modified so long as such changes or modifications mark no material departure from the salient features of the invention as expressed in the appended claims.

In the drawings:

FIG. 3 is a transverse section taken substantially on the line 3—3 of FIG. 2;

FIG. 4 is a transverse section taken substantially on the line 4—4 of FIG. 2;

FIG. 5 is a view in perspective of the valve unit removed from the encasing receptacle, the unit being in inverted position;

FIG. 6 is a transverse sectional view of the valve unit taken without the enclosing receptacle and showing portions of adjacent elements and the relationship of the valve to the same;

FIG. 7 is a bottom perspective of the valve element per se;

FIG. 8 is a transverse section taken on the line 8—8 of FIG. 7;

FIG. 9 is a sectional view of the lower portion only of the filter unit showing a second embodiment of the valve structure;

FIG. 10 is a view in perspective of the anti-drain back valve disc and showing a sealing disc associated therewith;

FIG. 11 is a perspective top view of the valve element which forms a part of the second embodiment of the valve structure, with portions of the element being broken away and in section;

FIG. 12 is a view in perspective looking at the top of one of the two spring elements;

FIG. 13 is a detailed sectional view of a modified form of valve seat plate; and FIG. 14 is an illustration in cross section of another embodiment of the pressure relief valve embodying a resilient seal designed to prevent leakage in assemblies which are not press-fitted into the receptacle.

Figure 2:
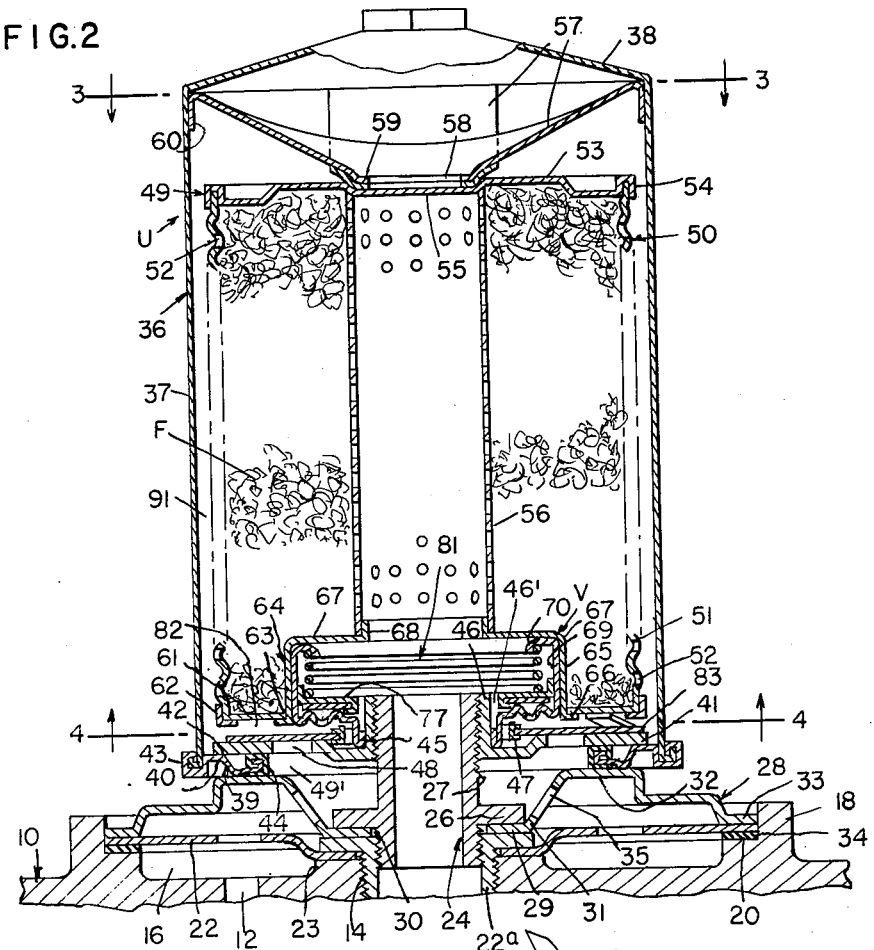
FIG. 2 is a longitudinal sectional view on an enlarged scale taken substantially on the line 2—2 of FIG. 1.
Figure 1:
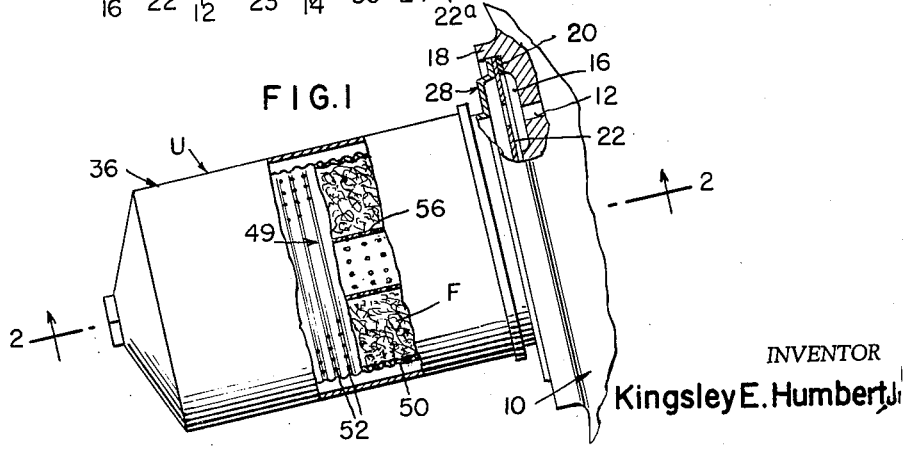
FIG. 1 is a view in side elevation of the improved throw-away filter structure of the present invention showing the same in mounted position with portions of the filter structure and portions of the engine block broken away and in section.

Referring now more particularly to the drawings and especially at this time to FIG. 1, the numeral 10 generally designates a portion of a casing, such, for example, as a part of an engine block which is bored in the conventional manner to provide an oil passage 12 which is supplied with oil from the usual oil pump, not shown, and an oil return passage designated 14 in FIG. 2 leading back to the oil distributing system. It is, of course, known to those versed in the art that in the use of oil filters of the full flow type as herein illustrated and described the return flow of oil passing through the passage 14 leads directly to the engine bearings.

The casing 10 is provided with an annular recess or channel 16 which is defined by a flange 18 and between the flange and the recess 16 is the inset shoulder 20 upon which rests a baffle plate 22, all as shown and described in my copending application Serial No. 622,477, filed November 15, 1956.

The baffle overlies the annular recess 16 and the center of the recess has the low upstanding portion 23 which defines the central passage or return flow passage 14 hereinbefore referred to and which passage is screw threaded to receive a flanged nipple 22a in which nipple is threaded the lower end of a tubular stud which is generally designated 24. The stud 24 intermediate its ends is encircled by the flange 26 and above the flange it is externally screw threaded as shown and indicated at 27.

The numeral 28 generally designates an adapter unit or adapter plate. This plate overlies the baffle plate 22 and is engaged as hereinafter described by a portion of the filter unit.

The adapter plate and the other parts thus far described are all shown and fully described in my copending application above referred to but for convenience in describing the mounting of the filter unit, the adapter plate may be defined as having a flat central portion 29 through which is a central opening 30 and this central portion merges with an upwardly and outwardly sloping portion 31 which in turn at its outer periphery or at its top part merges into a flat annular sealing portion or deck 32. The outer part of this deck portion is joined to the inset peripheral flange forming the outermost part of the adapter plate and which flange is designated 33 and is of a diameter to seat or fit within the annular rib upon the peripheral portion of the baffle plate as shown in FIG. 2.

A sealing element 34 overlies the peripheral portion of the baffle plate, resting upon the shoulder 20.

The inclined portion or middle portion 31 of the adapter plate has a number of fluid apertures 35 therethrough by means of which the oil or other fluid passes from the recess 16 to the filter unit.

As will be readily apparent, when the baffle plate 22 and the adapter plate 28 are in position over the annular recess 16, the middle portion 29 of the adapter plate will, in the arrangement here shown, rest upon the flanged nipple and when the lower end of the stud 24 is threaded into the nipple the annular flange or nut surrounding it will bear upon the top of the part 29 of the adapter and thus secure the latter in position while the externally threaded upper end of the stud provides means for threadedly attaching the filter unit.

The filter unit shown in FIG. 1 is generally designated U. This unit comprises the air tight shell or can 36 which embodies the annular wall 37 and the integral outer end wall 38 together with the applied inner end wall which is generally designated 39. The can body consisting of the annular wall 37 and the outer end wall 38 may be pressed or otherwise formed in one piece or from a single body of metal while the inner end wall which is sealingly secured to the inner end edge of the wall 37 comprises the thin metal annular closure sheet 40 and the flat disc-like and heavy reinforcing plate 41. In other words, the closure sheet 40 which is of relatively thin metal or of a metal substantially the same in weight as the wall 37 and the heavier reinforcing plate 41 are joined together, being welded as at 42 or joined in any other suitable means to form the integral inner end wall 39 and the periphery of the thin closure sheet is joined to the edge of the wall 37 by a rolled seam 43 in the usual manner of joining such metal receptacle parts together.

As previously stated, the closure sheet is in the form of an annulus and the inner edge thereof is embedded in a sealing gasket 44 of novel design and by a novel means all as set forth and claimed in my copending application Serial No. 16,709, filed March 22, 1960.

This gasket 44 is compressed between the plate 41 and the outer surface of the deck portion 32 of the adapter plate when the filter unit is mounted in position for use.

The plate 41 has a central opening 45 for the reception of the upper end of the mounting stud 24 and this opening is defined by the inwardly extending internally threaded neck 46 into which the stud threadedly engages. Adjacent to the neck 46 the plate 41 is encircled by the slightly depressed or sunken portion 47 and outwardly of this portion the plate 41 is provided with a number of oil admission openings 48.

It will be seen from the description of the filter structure and the mounting means thus far given that when the filter structure or filter unit is attached to the threaded stud and the gasket 44 is pressed upon the portion 32 of the adapter, there will be provided around the stud the oil receiving chamber 49' into which the oil passes through the opening 35 and from which it passes by way of the openings 48 to the interior of the shell or housing for the filter cartridge.

The filter cartridge and the pressure relief valve structure associated therewith are shown in two embodiments. Accordingly, reference will now be had to the first embodiment which is illustrated particularly in FIG. 2 to FIG. 8 and the reference character for which is applied to FIG. 1 and in this first embodiment the filter cartridge is generally designated 49.

The cartridge 49 is of cylindrical form and comprises the outer cylindrical metal wall 50 which preferably is circumferentially corrugated as illustrated, the corrugations being designated 51 and in the valleys between the corrugation ribs the metal plate is provided with a multiplicity of small oil or fluid passing apertures 52.

The outer end of the cartridge casing, of which the metal wall 50 forms the outer side, is closed by the imperforate head wall 53, the edge of which is joined to the edge of the wall 50 by the rolled seam 54 or in any other suitable manner. The central part of this head wall has the circular inwardly projecting or inwardly pressed part 55. This inwardly pressed part performs two functions, one of which is to enter the outer end of the apertured or foraminous tube 56 which extends axially through the cartridge and assists in centering the tube therein while the other function is to form a seat for a spring means which is interposed between the outer end wall 53 of the cartridge and the outer wall 38 of the shell or casing. This spring means is preferably in the form illustrated and comprises the two arcuate metal strips 57 which are transversely slightly dished and each of which has a central aperture 58 encircled by an out pressed rib 59, the rib projecting from the convex side of the spring body. The outer end of each of the arcuate spring parts 57 has the downturned flange 60 which substantially conforms to the inside circular contour of the shell or housing in which the cartridge unit is placed.

In use, the two spring parts 57 are arranged in crossed relation with the flange portions 59 nesting one in the other and with the flange of the lower spring unit resting in the depressed circular portion 55 of the cartridge head wall 53. The crossed spring elements thus form four arms and the flanged outer ends thereof bear against the underside of the outer end wall 38 as will be readily apparent and the springs serve to press the cartridge inwardly toward the plate 41 which forms a part of the inner wall 39.

The inner end of the cartridge has secured to the wall 50 the annular inner wall plate 61, the same being attached or secured at its periphery to the inner end edge of the wall 50 by the rolled seam 62 or it may be attached in any other desired or suitable manner. The inner wall plate 61 has a central opening 63 in which is mounted or fitted the pressure relief valve unit which is generally designated V. The valve V comprises the cup 64 which, like the other parts of the valve unit, are formed, preferably by pressing or stamping from a relatively light weight material and the cup consists of the circular wall portion 65 having an outer end outwardly directed flange 66 and an inner end wall portion 67 which is of annular form and terminates in the short outwardly or axially extending flange 68. The cup 64 extends through the opening 63 into the filter cartridge so that the flange 68 which encircles the edge of the annular wall portion 67 is directed inwardly and this flange also extends into the end of the apertured tube 56, thus providing a support for the tube or securing the tube in position between the valve and the head wall 53. The flange 68 which accordingly defines an annulus, provides a central passage or opening through the inner end of the cup for the out flow of fluid after it has passed through the cartridge, more especially through the filter medium which is within the space between the cartridge wall 50 and the tube 56 and the inner and outer ends of the cartridge. This filter medium may be in the form of a packed fibrous material F of any suitable character or it may be in the form of a fluted annular paper material, such as is disclosed in my previously referred to application Serial No. 622,477, suitably modified at the inner end to receive the valve unit V.

As will be readily apparent, the inside diameter of the cup 64 is materially greater than the diameters of the neck 46 and the stud which is threaded into the neck when the filter unit is attached for use and there is fitted into the cup 64 in encircling relation with the neck 46 of the plate 41 a spring encircling sleeve 69 which is tightly frictionally secured in the cup. The inner end of this sleeve 69 is turned inwardly and also turned back to form the channel-like flange 70 for the purpose hereinafter described.

Forming an integral inward extension of the lower end of the sleeve 69 is an annular valve seat plate 71 which has its inner edge joined to a downwardly extending short cuff 72, the end edge of which cuff is turned or rolled back as indicated at 73 to stiffen the same. The cuff is of an inside diameter to receive the neck 46 of the stiffening or reinforcing plate 41 when the cartridge is installed in the shell, in the manner illustrated in FIG. 2 and the end of the cuff rests upon and forms a sealing connection with the plate 41, within the depressed portion 47.

The seat plate 71 between the cuff and the sleeve 69 is formed with at least two concentric valve seat ribs 74 which project or bow inwardly and the portion of the seat plate between the ribs, which is downwardly bowed or curved as indicated at 75 is provided with a plurality of apertures 76 for the passage of fluid when the pressure relief valve is open.

Disposed within the sleeve 69 is the movable valve element which is generally designated 77. This valve element is in the form of a flat annular unit and comprises the elastic disc 78 and an overlying thin metal carrying disc 79, the inner edge of which disc is turned back as indicated at 80 to grip the inner edge of the annular elastic disc 77. The central opening of this valve is of such size as to encircle the neck 46 and provide a space therearound at 46' for flow of fluid therethrough to the outlet passage when the element is raised from the seat ribs 74 upon which the elastic disc portion rests, in the closed position of the valve.

The valve element 77 is normally maintained or pressed on the seat ribs by a coil spring 81 which is encased in the sleeve 69, the bottom end of the spring resting upon the unit as shown while the top end of the spring is engaged under the downturned flange 70 of the sleeve.

As shown particularly in FIG. 2 when the filter cartridge is installed in the shell or casing, the bottom edge of the cuff 72 wil rest in and make sealing contact with the surface of the depressed portion 47 of the reinforcing plate 41 and the cartridge will be supported in spaced relation with the plate 41, thereby providing the annular fluid receiving area 82 between the plate 41 and the wall 61 of the cartridge and around the neck 46.

Lying within the area 82 is the anti-drain back valve disc 83. This valve disc is preferably in the form of a thin body which may consist only of a thin sheet of metal 84 or it may comprise a sheet of metal with an under covering or coating of sealing or gasket material as indicated at 84'. The disc unit 83 has a central opening 85 through which the cuff 72 extends. This opening 85 carries a grommet 86 which may be in the form of a metal ring having a lower portion 87 lying against the underside of the disc body and an upper portion divided into a number of radially extending leaves 88 alternating with axially extending leaves or fingers 89 which project toward the underside of the valve seat plate 71.

Means is provided for yieldingly or resiliently pressing the valve disc element 83 onto the top surface of the plate 41 in covering or closing relation with the fluid passing openings 48, such means preferably being in the form of several resilient spring strips 90 cut and raised from the metal disc 84 as illustrated in FIG. 10, the elevated or raised free ends of these spring strips 90 bearing against the underside of the cartridge inner end wall 61.

When the valve element 83 is at rest upon the plate 41 to close the openings 48, the upwardly extending leaves or fingers 89 will be spaced at their upper ends from the overlying valve seat plate 71 and when the valve element 83 is raised from the surface of the plate 41 to permit fluid to pass into the area 82 through the openings 48, these fingers will engage the underside of the valve seat plate 71 to limit the movement of the element 83 so that the top of this element will not close the apertures 76 as it is necessary that these apertures remain uncovered when the relief valve is functioning to permit fluid to pass from the area 82 directly to the tubular outlet stud and the out flow passage.

As illustrated and as will, of course, be apparent, it is necessary that the over-all or outside diameter of the cartridge is less than the inside diameter of the shell whereby to provide the necessary flow area 91 around the cartridge to permit fluid to pass from the area 82 radially inwardly through the cartridge to the central tube 56.

FIGS. 9 and 11 illustrate a second form or embodiment of the pressure relief valve. Since all of the other structural features of the filter unit with which this second relief valve is employed are the same as hereinbefore described in connection with the first embodiment of the relief valve, only the lower portion of the filter unit is illustrated.

In the structure shown in these FIGS. 9 and 11, the cartridge enclosing shell, which may be of the same form as the shell 36, is here generally designated 36', the annular or longitudinal wall being designated 37' and the inner end wall structure being generally designated 39'. The numeral 40' designates the annular closure sheet of the inner end wall while the numeral 41' designates the heavier metal plate which at its inner end carries the inwardly extending internally threaded neck 46' in which the mounting stud is engaged. The numeral 49' generally designates the cartridge which carries the inner end closure sheet 61', while the central apertured tube within the cartridge is designated 56' and the filter material between the cup and the outer wall is designated F'. The pressure relief valve in the second embodiment thereof is generally designated V'. This relief valve comprises a cup portion 100 corresponding to the cup 65 and having the annular wall 101 formed at its outer end edge with the outturned flange 102 while at its inner end it joins the inwardly extending annular end wall 103, the central opening of which is defined by the axially outwardly extending neck 104 which projects into the apertured central tube 56 of the cartridge structure.

Cooperating with the cup 100 to secure the valve unit in position in the end of the cartridge is an inner liner which is generally designated 105. This liner is also of circular form and has the wall 106 of approximately the same length as the inside length of the cup wall 101 into which it is frictionally engaged. The outer edge of the wall 106 of the liner terminates in the surrounding outwardly extending flange 107, while the inner end of the wall 106 is joined to the narrow annular inner end wall 108 which terminates at its inner edge in the downturned lip 109. As will be seen from FIG. 9, the flange portion 102 of the cup engages against the inner side of the wall plate 61' adjacent to the edge of the opening therethrough so that the cup projects into the cartridge and the liner is fixed in the cup so that the flange 107 of the wall thereof bears against the outer side of the wall plate 61', thus holding the edge of the plate between this flange and the flange 102. The inner end wall 108 of the liner bottoms against the wall 103 of the cup and the radial width of this wall 108 is materially less than the radial width of the wall 103 so that there is provided a suitable receptacle for the inner end of the coil spring 110.

Fitted within the liner 105 is the valve spring encasing sleeve which is generally designated 111 and which comprises the circular wall part 112, the outer edge of which is joined to the annular valve seat plate 113 which is here shown as being of the same form as the previously referred to plate 71. This valve seat plate is formed as in the previously described structure with the concentric seat ribs 114 having the fluid passing apertures 115 in the valley lying between them and the inner edge of the seat plate 113 joins the cuff 116 which encircles the neck portion 46' of the end wall plate 41', resting at its outer edge on the latter plate to provide the support for the cartridge.

Enclosed within the sleeve to rest upon the valve seat ribs 114 is the spring pressed valve element which is generally designated 117. This element comprises the relatively thin elastic annular disc 118 which is secured against the underside of the thin metal disc 119 and which latter disc has a central opening 120 corresponding with the opening in the annular elastic disc 118 and an edge portion of this metal disc 119 around the opening is turned back through the opening of the elastic disc and clamps or grips the same on the underside as indicated at 121.

The metal disc 119 is encircled by the low upstanding flange 122 within the contour of which the bottom end of the spring 110 fits.

Inwardly of the flange 122 the metal plate 119 is provided with a circular series of upstruck fingers 123 which engage on the inner side of the coil spring when the latter is seated on the valve element as shown in FIG. 9 and as hereinbefore stated the spring engages at its upper end around the lip 109 and thus is positively retained in position between the valve element and the wall portion 108 of the liner body.

The anti-drain back valve element is here designated 83' and is of the same form or construction as the element 83 hereinbefore described and as will be understood it works back and forth or reciprocates in the area between the wall plate 61' of the cartridge and the reinforcing plate 41' for opening and closing the fluid admission ports 48'.

It is believed that the operation of the present relief valve, together with the anti-drain back valve, in both of the illustrated embodiments, will be readily apparent from the preceding description. However, a brief description of such operation is as follows.

When the filter unit has been installed for use by threadably attaching it to the tubular mounting stud 24, the sealing gasket 44 will, of course, come into sealing contact with the opposing surface of the adapter plate and the oil to be filtered will then flow through the ports 35 and 48, raising the anti-drain back valve element 83 or 83' and then pass radially outwardly into the area 91 between the cartridge and the shell wall. Fluid then, of course, flows radially inwardly through the filter medium and returns to the engine lubricating system by way of the apertured central tube 56, the tubular mounting stud 24 and the return flow passage in the casing.

In the event that a blockage of flow of fluid through the filter material occurs then, of course, the pressure will rise in the area 82 lifting the anti-drain back valve element from the surface of the reinforcing plate 40 or 41 and the fluid will then force the element 77 or 117 from the underlying seat ribs and flow directly to the tubular mounting stud thus by-passing the filter cartridge. As hereinbefore stated, by providing the anti-drain back valve element with the upstanding fingers 89 this element will be prevented from closing the apertures 76 or 115 and the desired flow of fluid can then be maintained.

In FIG. 13, there is shown a detail of a slightly modified form of the ribbed annular valve seat plate forming a part of the relief valve unit. Here the element, designated 124, may represent either sleeve 69 or sleeve 111. The annular valve seat plate is generally designated 125 and is pressed or otherwise formed with at least two concentric inwardly projecting ribs 126 between which is a downwardly projecting valley forming rib 127. This latter rib which is concentric with the ribs 126 and which lies between them may function as the means for limiting the outward movement of the anti-drain back valve element 83 or 83' and the sloping side walls of this rib 127 are provided with the fluid passing openings 128 instead of having these openings directly in the apex portion of the middle rib as they are shown in the previously described embodiments. With this construction, the anti-drain back element need only have a central opening therein to receive the cuff portion of the valve seat plate as the fluid may pass between the edge of the opening in the anti-drain back valve element and the cuff as well as passing around the outer edge of the anti-drain back valve element to reach the area 82 lying between the cartridge inner end wall plate and the reinforcing plate 40 or 41.

Another embodiment of the pressure relief valve is illustrated in FIG. 14 where the entire valve structure is designated V". In the description of the first two embodiments it has been set forth that the parts might be assembled or secured together by means of a press fit. In other words, the liner 105 might be press fitted into the cup or receptacle 100 and the spring encasing sleeve press fittted into the liner, in the structure illustrated in FIG. 9, and the same would be the case with the structure illustrated in FIG. 2 where the spring encasing sleeve is fitted into the receptacle or cup 64. In these ways of constructing the relief valve a sufficiently tight seal can be obtained to prevent undesired passage of fluid between the parts.

The structure of the third embodiment is so designed that the parts need not be press fitted to maintain the assemblage in place and a means is provided in this case to prevent leakage of fluid between the parts, particularly between the spring encasing sleeve and the liner.

In the construction referred to, the numeral 130 generally designates the cup or receptacle which comprises the cylindrical wall 131 which at the outer end is defined by the outwardly extending flange 132 and which flange bears against the inner side of the inner end wall 261 of the filter cartridge, not shown in this figure.

The opposite end of the wall 131 is defined by the annular end wall 133 which at its center carries the radially directed collar 134 which enters into or has engaged around it the inner end of the foraminous tube 256.

The numeral 135 designates the liner which is of similar construction to the liner 105. This liner 135 is also formed with the cylindrical wall 136 which fits in the receptacle and at the outer end it is defined by the radial and encircling flange 137 which bears against the outer side of the filter cartridge wall 261 thus securing this wall between itself and the flange 132 of the receptacle.

The wall 136 of the liner has the narrow inner end annular wall 138 and this wall at its inner edge joins the inwardly bent or reverted flange 139.

The inner side of the wall 138 has fitted thereagainst the resilient seal 140. This seal is annular, as shown, and the inner edge is secured in the reverted flange 139 and thus maintained in place. The outer edge of the seal engages the inner surface of the cylindrical wall 136.

The numeral 141 generally designates the valve spring encasing sleeve. This sleeve is of the same design or construction as the spring encasing sleeve 69 hereinbefore described and accordingly it is not believed that a detailed description of the same is necessary in order to convey an understanding of the manner in which it cooperates with the other elements immediately adjacent thereto. Accordingly reference will only be made to the cylindrical wall portion 142 which encircles and encases the spring 143 and which wall portion 142 at its inner end is defined by the inwardly extending channel flange 144 in which one end of the spring 143 seats.

The other parts of the spring encasing sleeve are the same as in the preceding structures.

When the spring encasing sleeve is inserted into the liner in the manner shown, the spring retaining channel flange 144 will bear on its outer side, which is of generally semi-circular contour, or arcuate, against the seal 140. The pressure of the fluid within the area 82, reference being had now to FIGS. 2 and 6, will, in the normal operation of the valve, press the sleeve unit 141 inwardly and thereby insure the maintenance of good sealing connection between the flange 144 and the resilient seal 140. This will thus effectively prevent any leakage or passage of fluid between the spring encasing sleeve and the liner 135.

The resilient seal may be formed of any suitable material which is unaffected by coil or other fluids in connection with which the filter unit may be used.

From the foregoing it will be seen that there is provided by the present invention a new and novel form of filter unit incorporating a particularly novel type of relief valve structure which has many advantageous features as hereinbefore set forth.

I claim:

1. A filter structure comprising a fluid tight shell having an inner end wall consisting of a plate with a central fluid outlet opening and inlet openings disposed around said outlet opening, an annular filter cartridge disposed in said shell having a center tube therein, means sealing off the upper end of said cartridge and center tube, other means sealing off the lower end of said cartridge, a cylindrical cup member having an outer annular vertical wall of substantially greater diameter than said center tube disposed within the lower end of said cartridge, a horizontally inwardly extending wall forming the top of said cup member and having a central opening therein in alignment with the lower end of said center tube and communicating therewith, the lower end of said annular vertical wall being open and in communication with said fluid outlet opening of said plate, an annular valve seat plate having by-pass ports therein closing off said lower open end of the cup member around said fluid outlet opening, and having a vertical collar disposed around said fluid outlet opening and seated upon said end wall plate, said vertical collar spacing the lower end of said cartridge from said end wall plate, a flat annular valve disc disposed within said cup member having a diameter to encircle said fluid outlet opening and seated upon said annular valve seat plate, biasing means mounted between said valve seat plate and horizontal wall of said cup member normally maintaining said valve disc seated to close off said by-pass ports, and a resilient anti-drain back valve lying in the space between said inner plate end wall of the shell and said annular valve seat plate and yieldingly closing the fluid inlet openings of said end wall plate.

2. The filter structure of claim 1 wherein said valve seat plate is provided with a sleeve and liner members for frictionally engaging said cup member.

3. The filter structure of claim 1 wherein said anti-drain back valve is provided with vertical members for contact with the underside of said valve seat plate to limit movement of the anti-drain back valve to prevent closing off of said by-pass ports.

4. The filter structure of claim 1 wherein said by-pass valve seat is provided with two annular ribs and said by-pass ports are disposed between said ribs.

5. A filter structure comprising a fluid tight shell having an inner end wall consisting of a plate with a central fluid outlet opening and inlet openings disposed around said outlet opening, an annular filter cartridge disposed in said shell having a center tube therein, said filter cartridge having an enlarged annular indented portion in the lower inner end thereof, means sealing off the upper end of said cartridge and center tube, other means sealing off the lower end of said cartridge, a cylindrical cup member having an outer annular vertical wall of substantially greater diameter than said center tube disposed within said lower annular indented portion thereof, a horizontally inwardly extending wall forming the top of said cup member and having a central opening therein in alignment with the lower end of said center tube and communicating therewith, the lower end of said annular vertical wall being open and in communication with said fluid outlet opening of said plate, an annular valve seat plate having by-pass ports therein closing off said lower open end of the cup member around said fluid outlet opening, and having a vertical collar disposed around said fluid outlet opening and seated upon said end wall plate, said vertical collar spacing the lower end of said cartridge from said end wall plate, a flat annular valve disc disposed within said cup member having a diameter to encircle said fluid outlet opening and seated upon said annular valve seat plate, biasing means mounted between said valve seat plate and horizontal wall of said cup member normally maintaining said valve disc seated to close off said by-pass ports, and a resilient anti-drain back valve lying in the space between said inner plate end wall of the shell and said annular valve seat plate and yieldingly closing the fluid inlet openings of said end wall plate.

6. The filter structure of claim 5 wherein said valve seat plate is provided with a sleeve and liner members for frictionally engaging said cup member.

7. The filter structure of claim 5 wherein said anti-drain back valve is provided with vertical members for contact with the underside of said valve seat plate to limit movement of the anti-drain back valve to prevent closing off of said by-pass ports.

8. The filter structure of claim 5 wherein said by-pass valve seat is provided with two annular ribs and said by-pass ports are disposed between said ribs.

References Cited in the file of this patent

UNITED STATES PATENTS

| | | |
|---|---|---|
| 2,598,322 | Vokes | May 27, 1952 |
| 2,877,902 | Chase et al. | Mar. 17, 1959 |
| 2,884,133 | Walulik et al. | Apr. 28, 1959 |
| 2,995,249 | Boewe et al. | Aug. 8, 1961 |

OTHER REFERENCES

"New Sludglok," publication by Champion Laboratories, West Salem, Illinois.